United States Patent
Schimmels et al.

(10) Patent No.: US 9,840,012 B2
(45) Date of Patent: Dec. 12, 2017

(54) VARIABLE STIFFNESS ACTUATOR WITH LARGE RANGE OF STIFFNESS

(71) Applicant: Marquette University, Milwaukee, WI (US)

(72) Inventors: Joseph M. Schimmels, Milwaukee, WI (US); Daniel Garces, New Berlin, WI (US)

(73) Assignee: Marquette University, Milwaukee, WI (US)

( * ) Notice: Subject to any disclaimer, the term of this patent is extended or adjusted under 35 U.S.C. 154(b) by 0 days.

(21) Appl. No.: 14/786,881

(22) PCT Filed: Apr. 24, 2014

(86) PCT No.: PCT/US2014/035294
§ 371 (c)(1),
(2) Date: Oct. 23, 2015

(87) PCT Pub. No.: WO2014/176423
PCT Pub. Date: Oct. 30, 2014

(65) Prior Publication Data
US 2016/0082603 A1    Mar. 24, 2016

Related U.S. Application Data

(60) Provisional application No. 61/815,485, filed on Apr. 24, 2013.

(51) Int. Cl.
*B25J 19/06* (2006.01)
*F16D 3/56* (2006.01)
(Continued)

(52) U.S. Cl.
CPC ........... *B25J 19/068* (2013.01); *B25J 9/1005* (2013.01); *B25J 9/126* (2013.01); *F16D 3/56* (2013.01);
(Continued)

(58) Field of Classification Search
CPC ........ B25J 19/068; B25J 9/1005; B25J 9/126; F16F 1/22; Y10S 901/19; Y10S 901/23
See application file for complete search history.

(56) References Cited

U.S. PATENT DOCUMENTS

| 3,839,883 A | 10/1974 | Braess |
| 4,432,739 A | 2/1984 | Walter |

(Continued)

FOREIGN PATENT DOCUMENTS

| CN | 1253898 A | 5/2000 |
| CN | 102672726 | 9/2012 |

(Continued)

OTHER PUBLICATIONS

Notification of the First Office Action in corresponding Chinese Appln. No. 201480023936.4, dated Jul. 1, 2016.
(Continued)

*Primary Examiner* — Vishal Sahni
(74) *Attorney, Agent, or Firm* — Andrus Intellectual Property Law, LLP

(57) ABSTRACT

In one embodiment, a selectable-rate spring comprises a flexure bar connected to a rotatable shaft, the flexure bar having at least one arched portion. The selectable-rate spring also includes at least one rotational contactor connectable to a link member, wherein the rotational contactor rotates about an axis while maintaining contact with the arched portion of the flexure bar. As the rotational contactor rotates, it changes the connection stiffness between the rotatable shaft and the link member.

20 Claims, 4 Drawing Sheets

(51) Int. Cl.
  *F16F 1/22* (2006.01)
  *B25J 9/10* (2006.01)
  *B25J 9/12* (2006.01)

(52) U.S. Cl.
  CPC .............. *F16F 1/22* (2013.01); *Y10S 901/19* (2013.01); *Y10S 901/23* (2013.01)

(56) References Cited

U.S. PATENT DOCUMENTS

| | | | | |
|---|---|---|---|---|
| 5,443,247 | A * | 8/1995 | Polites | B64G 1/22 244/173.2 |
| 6,109,134 | A | 8/2000 | Sudau | |
| 2010/0320658 | A1 * | 12/2010 | Mueller | B60G 11/36 267/151 |
| 2012/0292839 | A1 * | 11/2012 | Smith | B64C 27/001 267/140.13 |
| 2013/0079160 | A1 * | 3/2013 | Brosowske | F16D 3/80 464/27 |
| 2016/0025150 | A1 * | 1/2016 | Bachmaier | F16F 15/023 464/28 |

FOREIGN PATENT DOCUMENTS

| | | |
|---|---|---|
| GB | 25725 A | 0/1912 |
| GB | 726635 B2 | 3/1955 |
| SU | 1773292 A3 | 10/1992 |

OTHER PUBLICATIONS

International Search Report and Written Opinion in corresponding PCT Appln. No. PCT/US2014/035294, dated Sep. 4, 2014.
International Preliminary Report on Patentability n corresponding PCT Appln. No. PCT/US2014/035294, dated Oct. 27, 2015.
Ham R et al. "Compliant Actuator Designs", IEEE Robotics & Automation Magazine, 2009, 16(3): 81-94.
Extended European Search Report issued in corresponding EP Application No. 14788460 dated Jul. 5, 2017.

* cited by examiner

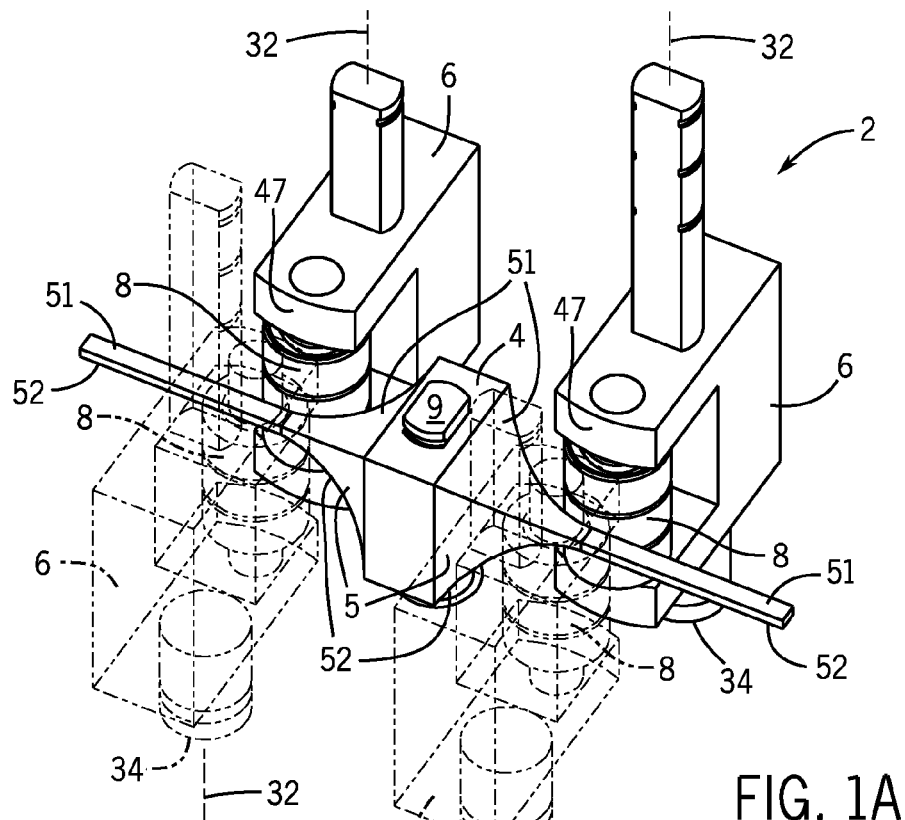
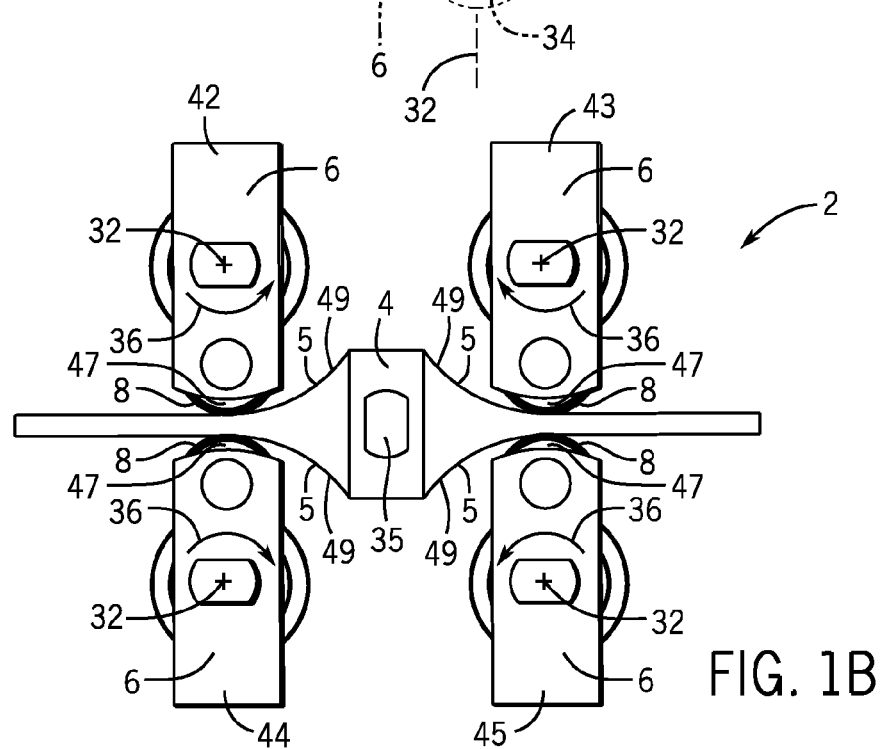

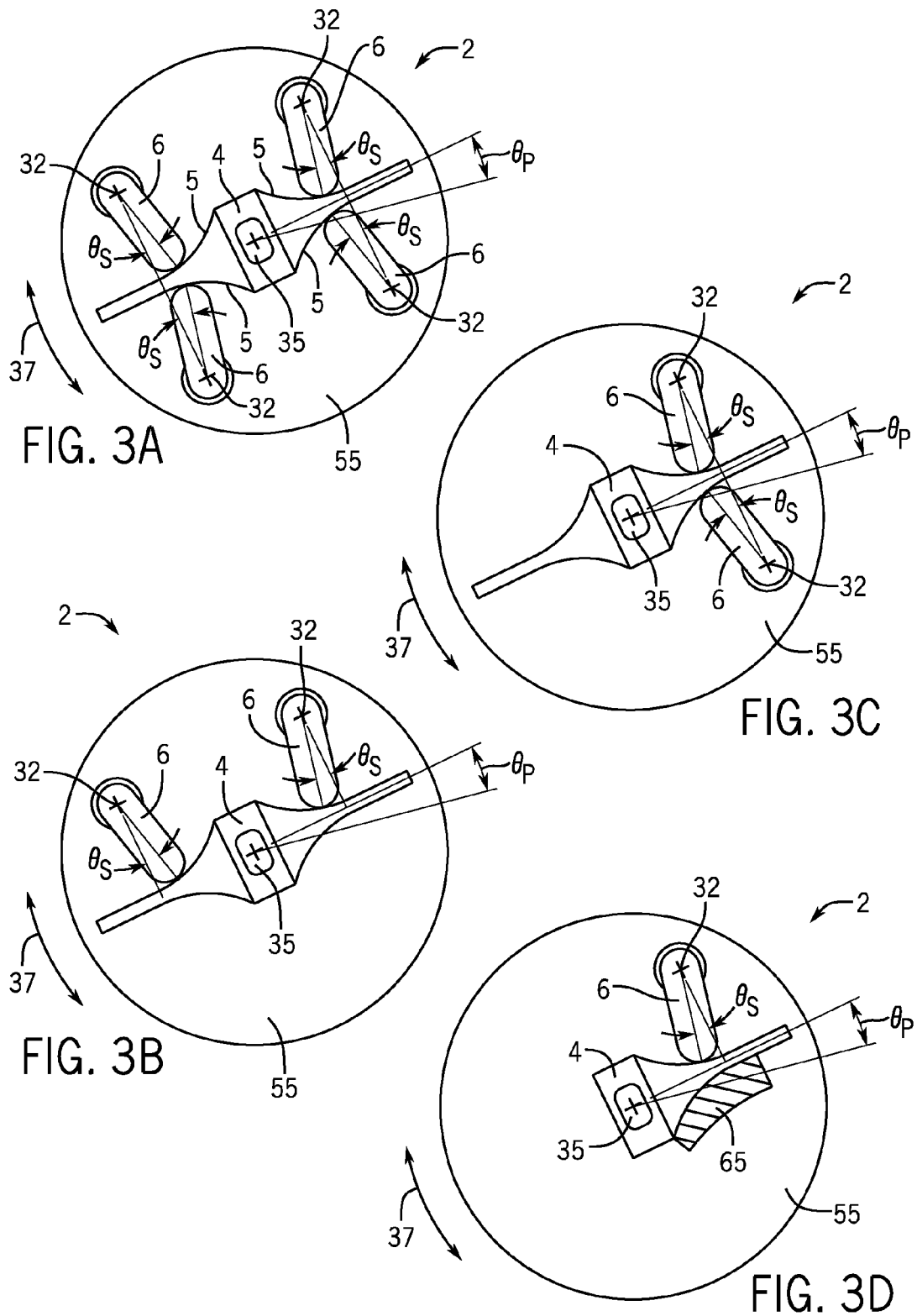

VARIABLE STIFFNESS ACTUATOR WITH LARGE RANGE OF STIFFNESS

CROSS-REFERENCE TO RELATED APPLICATIONS

This application is the U.S. national stage application of International Application PCT/US2014/035294, filed Apr. 24, 2014, which international application was published on Oct. 30, 2014, as International Publication WO2014/176423 in the English language. The international application is incorporated herein by reference, in entirety. The international application claims priority to U.S. Provisional Patent Application No. 61/815,485, filed Apr. 24, 2013, which is incorporated herein by reference, in entirety.

BACKGROUND

Actuators are parts that convert stored energy into movement, and in that way are like the "muscles" of a robot. Current conventional robots use high stiffness actuators, or powered joints, to provide absolute positioning accuracy in free space. For example, in traditional manufacturing operations where robots perform tedious and repetitious tasks in a controlled environment with great speed and precision, position controlled robots that stiffly follow predefined joint trajectories are optimal. Traditional position controlled actuators are designed from the premise that stiffer is better. This approach gives a high bandwidth system, but is prone to problems of contact instability, noise, and low power density.

Variable stiffness actuators provide many benefits in force control of robots in constrained, unstructured environments. In unstructured environments, where little is known of the environment, force controlled joints or variable stiffness actuators are desirable because they allow a robot to comply with its surroundings. Such robots can execute dynamic activity in a changing and unpredictable environment—e.g., humanoid robots, legged robots walking over rough terrain, robotic arms interacting with people, wearable performance-enhancing exoskeletons, haptic interfaces, and other robotic applications.

Variable stiffness actuators provide benefits including shock tolerance, lower reflected inertia, more accurate and stable force control, extremely low impedance, low friction, less damage to the environment, and energy storage. However, current variable stiffness actuators available in the art do not provide an adequate range of stiffness required for many applications. For example, currently-available actuators are only capable of obtaining a ratio of highest stiffness to lowest stiffness in the range of about 10. Moreover, many current variable stiffness actuators cannot provide adequate maximum stiffness, especially for a full range of motion. Furthermore, many current variable stiffness actuators are too slow in adjusting their stiffness to adequately perform their function.

SUMMARY

In one embodiment, a selectable-rate spring comprises a flexure bar connected to a rotatable shaft, the flexure bar having at least one arched portion. The selectable-rate spring also includes at least one rotational contactor connectable to a link member, Wherein the rotational contactor rotates about an axis while maintaining contact with the arched portion of the flexure bar. As the rotational contactor rotates, it Changes a connection stiffness between the rotatable shaft and the link member.

A variable stiffness actuator may comprise a chive motor having a drive shaft and a flexure bar rigidly connected to the drive shaft, the flexure bar having an arched portion. The variable stillness actuator may further include a rotational contactor connected to a link member, wherein the rotational contactor rotates about an axis while maintaining contact with the arched portion of the flexure bar. A motor connected to the rotational contactor rotates the rotational contactors, wherein as the rotational contactor rotates it changes a connection stiffness between the drive shaft and the link member.

One embodiment of a system for providing variable stiffness actuation includes a drive motor having a drive shaft and a selectable-rate spring. The selectable-rate spring may include a flexure bar rigidly connected to the drive shaft, the flexure bar having at least two arched portions, and at least two rotational contactors connected to a link member. The rotational contactors each rotate about an axis while maintaining contact with the flexure bar. The system may further include a motor connected to both of the rotational contactors so as to rotate the rotational contactors to vary the stiffness of the selectable-rate spring.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings:

FIG. 1A provides an exemplary embodiment of a selectable-rate spring.

FIG. 1B provides a plan view of the shown in FIG. 1A.

FIGS. 3A-3D depict various embodiments of a selectable-rate spring.

DETAILED DESCRIPTION OF THE DRAWINGS

The present invention overcomes the shortcomings described above with respect to currently available variable stiffness actuators. The variable stiffness actuator (VSA) of the present invention is designed to provide a very large range of stiffness in a compact size. The VSA of the present invention further allows a continuous variable stiffness for a full range of motion, zero stiffness for a small range of motion, and can rapidly change from minimum to maximum stiffness. Thereby, the VSA of the present invention provides increased safety and better function in performing complex tasks.

A selectable-rate spring, such as the embodiment shown in FIGS. 1A and 1B, may be included as part of the motor actuator to allow improved force control between the drive motor 12 and the driven load. As described herein, the stiffness is varied by changing the location of the restraining contact along the bar made by the contactor. Thus, stiffness control may conic from varying the direction of constraining forces on a range of variable thickness and area of the bar of the VSA. Using the selectable-rate spring 2 of the present invention, the VSA may be capable of providing a maximum stiffness of 1200 times greater than the minimum stiffness, allowing a wide range of operating stiffness for the actuator. The VSA 3 may provide 360° of motion, and can also become a free joint for limited ranges. In the exemplary embodiment of FIGS. 1-2, the VSA may change from a maximum to a minimum stiffness very quickly, such as in 0.12 seconds.

Figure 2A:
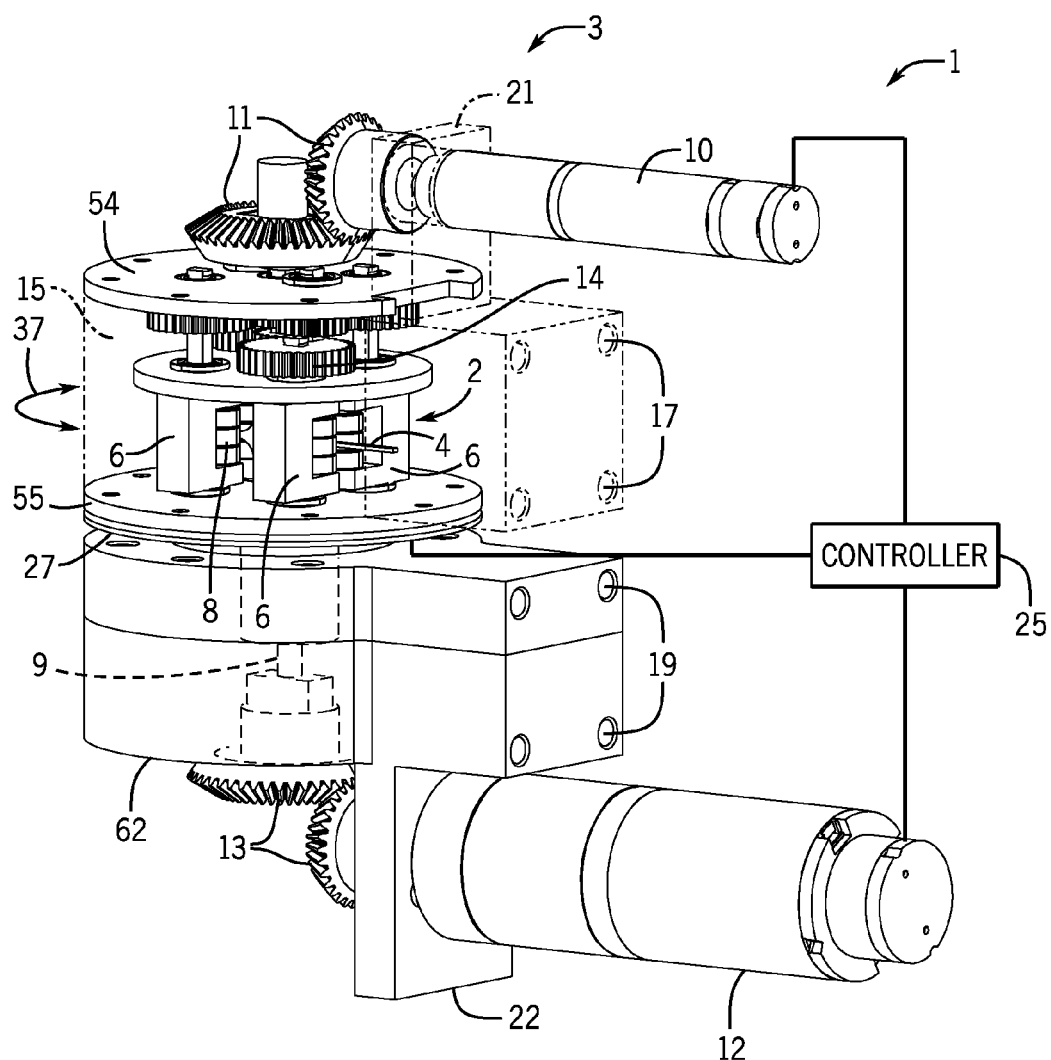
FIGS. 2A-2B depict an exemplary embodiment of a system for providing variable stiffness actuation.

As shown in FIG. 2A, a variable stiffness actuator may include a drive motor 12 connected to a driven element that may connect to the connection point 17. In a variable stiffness actuator, a compliant element may be placed between the drive motor and the driven load to intentionally reduce the stiffness of the actuator and, as in the case of the disclosed VSA, provide variable stiffness control. FIG. 1A provides an exemplary embodiment of a selectable-rate spring 2 for incorporation into VSA 3. The selectable-rate spring 2 has a flexure bar connectable to a rotatable shaft 9, such as a drive shaft. The flexure bar has at least one arched portion 5 that is formed to correspond with the one or more rotational contactors 6. Accordingly, the arched portion 5 may be circular, or semi-circular, or a curve of constant curvature.

In the embodiment of FIGS. 1A and 1B, the selectable-rate spring 2 has four rotational contactors 6 each on opposing sides of the flexure bar 4. The rotational contactors 6 each rotate about axis 32 in order to vary the location of their contact with the flexure bar 4. More specifically, the embodiment of FIGS. 1A-1B has a first rotational contactor 42, a second rotational contactor 43, a third rotational contactor 44, and a fourth rotational contactor 45. Each of the rotational contactors 42-45 rotates around a respective axis of rotation 32. For at least a portion of that rotation, the rotational contactors 42-45 maintain contact with one of four arched portions 5 of the flexure bar 4. The selectable-rate spring 2 operates such that the rotational contactors 6 may rotate inwards, towards the center of the flexure bar 4 to create stiffer actuation, or connection stiffness, between a drive motor and a driven load. Conversely, the rotational contactors 6 may rotate outwards, away from the center of the flexure bar 4 to create a looser, less stiff, connection between the chive motor and the driven load.

FIG. 1B demonstrates a potential rotational direction 36 of each rotational contactor 42-45. The rotational contactors are rotating inward, toward the center of the flexure bar 4, which provides the connection point 35 to a rotatable shaft 9. For example, the first rotational contactor 42 and the fourth rotational contactor 45 rotate in a counterclockwise direction to move their contact end 47 towards the center of the flexure bar 4, thereby to stiffen the actuation. Conversely, the second rotational contactor 43 and the third rotational contactor 44 rotate in a clockwise rotational direction 36 about their axes of rotation 32 to rotate their contact ends 47 toward the center of the flexure bar 4. Conversely, to provide a less stiff actuation, the rotational contactors 42-45 would move in the opposite rotational direction 36 as that depicted in FIG. 1B, thereby rotating the contact end 47 of the rotational contactors 42-45 away from the center of the flexure bar 4.

FIG. 1B depicts a selectable-rate spring 2 having its rotational contactors 42-45 in a middle position, which would provide a low amount of stiffness compared to the maximum stiffness level. The rotational contactors 42-46 may rotate to an inward-most point 49 on the flexure bar 4 to create the stiffest connection between the drive motor and the driven element. Oppositely, the rotational contactors 42-45 may rotate away from the center of the flexure bar 4 to an extreme outward point to allow the least stiff connection between the drive motor and the driven element. At an outward-most position, the contact end 47 of the rotational contactors 42-45 may no longer be in contact with the flexure bar 4. For example, the rotational contactors 42-45 may rotate to become parallel, or nearly parallel, with the direction of the flexure bar 4. In such a position, the contact end 47 of the rotational contactors 42-45 would not be touching the flexure bar 4 and the flexure bar 4 would have a range of free motion where it was not contacting the rotational contactors 6. In such an outward-most position, the VSA 3 would provide zero stiffness within the range of motion where the flexure bar 4 was not in contact with the rotational contactors 42-45.

The flexure bar 2 is designed to physically bend to provide the compliance or flexibility in the joint. Preferably, the flexure bar 4 is the least rigid portion of the selectable-rate spring 2, and of the VSA 3 in general. In a preferred embodiment, the stiffness of the flexure bar 4 is significantly lower than the stiffness of all other components of the VSA 3. Thereby, the stiffness of the flexure will dominate the variable stiffness function of the VSA 3 as a whole. For example, the rotational contactors 6, the actuator housing 15, the drive motor link 13, the drive shall 9, and rotational contactor motor link 11, the rotational contactor motor transmission system 14, may all provide significantly more stiffness than the stiffness of the flexure bar. Thereby, the flexibility, or lack of stiffness, comes from the flexure bar 4.

The flexure bar 4 may be comprised of any material that provides sufficient flex for a given VSA application while also avoiding undergoing any plastic deformation due to force on the flexure bar 4. For example, the flexure bar 4 may be comprised of a pseudoelastic, or superelastic, material. The pseudoelastic material may be a shape-memory alloy, such as a superelastic alloy. When mechanically loaded, the superelastic alloy deforms reversibly to very high strains, such as up to 10%. When the load is removed, the superelastic alloy returns to its original shape. Preferably, no change in temperature is needed for the alloy to recover its initial shape. For example, in one embodiment, the flexure bar 4 may be comprised of a nitinol (nickel-titanium) alloy, or any of the cobalt-nickel, nickel-iron, or nickel-manganese alloys that have superelastic properties.

In other embodiments, the flexure bar may be comprised of titanium, aluminum, or other metal alloys. As described above, the rotational contactor is preferably comprised of a stiffer material than the flexure bar 4. For example, the rotational contactors 6 may be comprised of steel, titanium, or other hard metals or metal alloys.

In addition to material, the stiffness of the flexure bar 4 and of the selectable-rate spring 2 in general may be varied by varying other aspects of the design. For example, the following variables may be changed to adjust the stiffness of the selectable-rate spring 2 design: the length of the flexure bar 4, the radius of the arched portion 5, length of the rotational contactors 6, the shape of the top 51 and bottom 52 of the flexure bar 4, and the maximum force application angle, the minimum height of the distal end of the flexure bar 4, and the minimum width of the distal end of the flexure bar 4.

The arched portion 5 of the flexure bar 4 is shaped to accommodate the rotational contactor 6 as it rotates about its axis of rotation 32. By changing the relevant variables described above, the arched portion 5 may also be designed to optimize the stiffness of the flexure bar 4 across the length thereof for a given application. In the embodiment depicted in FIGS. 1A and 1B, for example, the arched portions 5 of the flexure bar 4 have arched portions on the top 51 and bottom 52 of the flexure bar 4. Those arched top and bottom portions may have any arch radius. In other embodiments of the flexure bar 4, the top 51 and bottom 52 portions may take on other shapes. For example, the top 51 and bottom 52 of the flexure bar may be straight, running parallel with one another across the length of the flexure bar. Alternatively, the top 51 and bottom 52 portions of the flexure bar 4 may taper inwards or flare outwards. Such design elements may be used, for example, to create a flexure bar 4 with a given profile of the stiffness relative to the contact angle $\theta_s$.

Referring to FIGS. 1A and 1B, the rotational contactors 6 have bearings S on each contact end 47. Each rotational contactor 6 may have one or more bearings S that roll to maintain contact with the flexure bar 4. More specifically, as the rotational contactor 6 rotates about its axis 32, the bearing 8 rolls so that the rotational contactor 6 can move along the arched portion 5 of the flexure bar 4 without having to overcome sliding frictional forces. In the embodiment of FIG. 1A, for example, the selectable-rate spring 2 has rotational contactors 6 that each have three bearings 8 on the contact end 47 thereof. The three bearings 8 roll along the arched portion 5 of the flexure bar 4 as the rotational contactors 6 rotate about their respective axes of rotation 32. When the rotational contactor 6 are in their middle position, as shown in FIG. 1A, only the middle bearing 8 is in contact with the flexure bar 4. As the rotational contactors 6 move inwards, toward the center of the flexure bar 4, the upper and lower bearings 8 also come in contact with the arched portion 5 of the flexure bar 4.

In other embodiments, the rotational contactor 6 may have a single, larger, bearing instead of the three bearings in the embodiment of FIG. 1A. Alternatively, the rotational contactor 6 may have any number of bearings 8 on the contact end 47 of the rotational contactor 6. In still other embodiments, the contact end 47 of the rotational contactor 6 may not have any bearings, and other means may be employed to allow the contact end 47 of the rotational contactor 6 to move with respect to the arched portion 5 of the flexure bar 4.

Figure 2B:
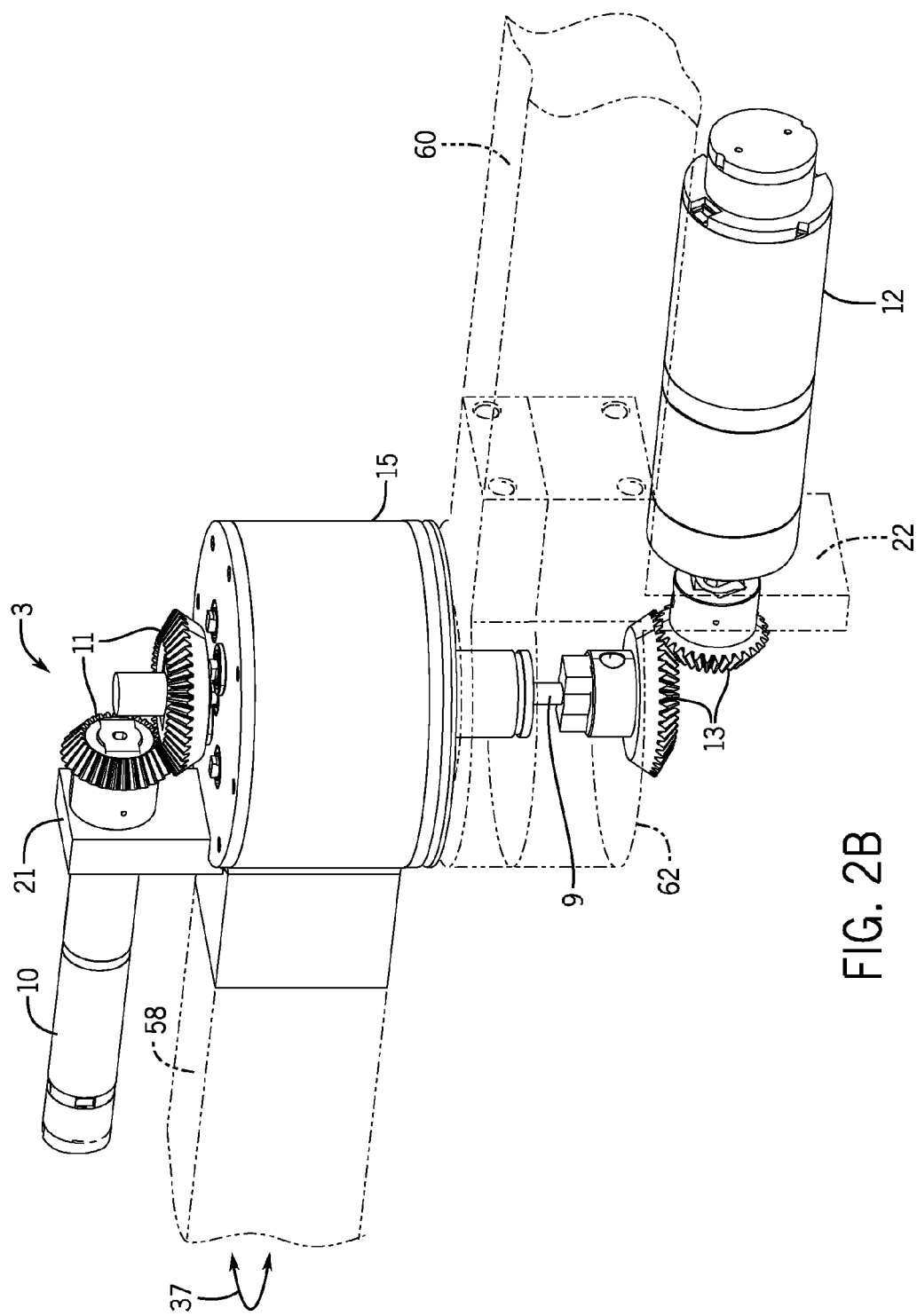

Turning to FIG. 2A, a system 1 for providing variable stiffness actuation may include a variable stiffness actuator 3 and a controller 25. The system may further include a rotary position sensor 27, which may provide input to the controller 25. The variable stiffness actuator 3 incorporates a selectable-rate spring 2, such as the embodiment of the selectable-rate spring 2 shown in FIGS. 1A and 1B. The variable stiffness actuator 3 further comprises a drive motor 12 having a rotatable drive shaft 9 connected to the connection point 35 of the flexure bar 4. The rotation of the rotational contactors 6 is driven by the motor 10 which is attached to one or more of the rotational contactors 6 through the motor transmission system 14. An actuator housing 15 surrounds the selectable-rate spring 2 and the transmission system 14. The motor 10 may connect to the actuator housing 15 via mounting plate 21. In the embodiment of FIG. 2, the actuator housing 15 rotatably connects to each of the rotational contactors 6 at a respective connection point 34 (FIG. 1A). The actuator housing 15 of FIGS. 2A-2B also connects to a link member 58 at the link member connection point 17. The actuator housing 15 is adjacent to the first housing 62, which is connected to a first member 60 at connection point 19.

In the embodiment of the variable stiffness actuator 3 depicted in FIGS. 2A and 2B, the drive motor 12 drives the rotation of the actuator housing 15, which is connected to link member 58. For example, the drive motor 12 functions to rotate the link member 58 and the actuator housing 15 in the rotational direction 37. The drive motor 12 connects to the first housing 62 via the motor mounting plate 22. Thus, such rotation is actuated with respect to the first member 60 and first housing 62. The drive motor 12 connects to the rotatable drive shaft 9 via the drive motor link 13. The drive shaft 9 then connects to the flexure bar 4. If the flexure bar is in contact with the rotational contactors 6, then the rotation of the flexure bar 4 will cause rotation of the actuator housing 15. Namely, the one or more rotational contactors 6 are connected to the bottom plate 55 and/or top plate 54 of the actuator housing 15, and thus any force imparted on the rotational contactor 6 would be imparted to the actuator housing 15. If the one or more rotational contactors 6 are in an inward-most position, for example, then the selectable-rate spring 2 will be stiff and will impart all, or nearly all, of the motion from the drive shaft 9 to the actuator housing 15. On the other hand, if the one or more rotational contactors 6 are in an outward-most position, and the flexure bar 4 rotates freely Within a certain degree of motion, then none of the Motion of the drive shaft 9 will be imparted to the actuator housing 15 within that range of motion where the flexure bar 4 is not in contact with the rotational contactor 6. It follows that the rotational contactor may be anywhere in between the inward-most and outward-most positions, and thus, due to the varying flex of the flexure bar 4, a varying amount of motion will be imparted from the drive shaft 9 to the actuator housing 15.

The controller 25 may be employed to control the drive motor 12 and the motor 10 connected to the one or more rotational contactors 6. Such control may be feed-forward control, providing a control signal to the drive motor 12 and/or the motor 10 controlling the rotational contactors 6 in a predefined way. In other words, the controller may provide variable stiffness to the selectable-rate spring 2 according to a predefined program or plan. Alternatively, the controller may receive input from a rotary position sensor 27 on the VSA 3 that provide position information of the actuator housing 15 relative to the drive shaft 9 such that the controller can modify the stiffness program or the motion program according to whether the flex of the flexure bar 4 deviates from the programmed plan. For example, if the torque on the joint is causing more deflection of the flexure bar 4 than expected, the control program may be modified to account for the difference.

FIGS. 3A-3D show various embodiments of the selectable-rate spring 2. In FIG. 3A, the selectable-rate spring 2 comprises four rotational contactors 6 and a flexure bar 4. There, the motor 10 may drive all four rotational contactors 6 simultaneously. The motor transmission system 14 operates to impart rotational motion in the correct rotational direction 36 (FIG. 1B) on each of the rotational contactors 6. As described above, the rotational contactors 6 rotate about axis of rotation 32. Further, at axis 32 the rotational contactors 6 are connected to the bottom plate 55 of the actuator housing 15 at the connection point 34 for each rotational contactor 6. Thereby, the motion from the flexure bar 4 is transmitted to the actuator housing 15 at the connection point 34 between the rotational contactors 6 and the bottom plate 55 or top plate 54 of the actuator housing 15.

In embodiments involving inure than one rotational contactor driven by a single motor 10, the motor 10 may act to rotate half of the rotational contactors 6 in a clockwise rotational direction 36, while the other half is rotated in a counterclockwise rotational direction 36. As the motor 10 rotates the rotational contactors 6, the angles $\theta_s$ of the rotational contactors 6 change such that the magnitude of the angles $\theta_s$ of each of the rotational contactors 6 is the same. Thus, when the rotational contactors 6 are in a middle position, i.e., the central line of each set of rotational contactors align with one another and are perpendicular with the center line of the flexure bar 4, $\theta_s=0$. As the rotational contactors 6 are moved outward or inward, the magnitude of $\theta_s$ increases equally for all four rotational contactors. In other embodiments, each of the rotational contactors 6 may be controlled individually, and thus the $\theta_s$ of the various rotational contactors 6 may differ at any given time.

As described above, the flexure bar 4 is driven by drive motor 12. Depending on the position of the rotational contactors 6, the flexure bar 4 may impart rotation on the actuator housing 15. The rotation imparted on actuator housing 15 may be measured as angle $\theta_p$ with respect to a particular position, such as the position of the first housing 62. In various embodiments, the variable stiffness actuator 3 may be designed to provide 360° of motion, and thus $\theta_p$ may vary from 0 to 360. In other embodiments, the variable stiffness actuator 3 may be designed to allow a more limited range of motion, which would limit the range of $\theta_p$.

FIGS. 3B and 3C each show embodiments of selectable-rate springs 2 having two rotational contactors 6 positioned on opposite sides of the flexure bar. In FIG. 3B, the rotational contactors 6 are positioned on opposite sides of the drive shaft, or the connection point 35 between the flexure bar 4 and the drive shaft 9. FIG. 3C depicts an embodiment of the selectable-rate spring 2 having two rotational contactors 6 positioned on opposing sides of the flexure bar 4, but on the same side of the connection point 35 to the drive shaft 9. In both of the embodiments of FIGS. 3B and 3C, the selectable-rate spring 2 will provide variable stiffness in both the clockwise and counterclockwise rotational direction 37. Thus, through rotation of the two rotational contactors 6, the selectable-rate spring 2 can provide variation in the stiffness of the connection between the drive shaft 9 and the actuator housing 15 in both circular directions. This is contrasted with the embodiment of FIG. 3D, in which the selectable-rate spring 2 provides stiffness variation in only one direction.

In the embodiment of FIG. 3D, the selectable-rate spring 2 has only a single rotational contactor 6. The rotational contactor 6 is positioned to allow variable stiffness in the counterclockwise rotational direction 37. Namely, the rotational contactor 6 may rotate along the flexure bar 4 to increase or decrease the stiffness of the connection between the flexure bar 4 and the rotational contactor 6 when the flexure bar 4 is pressed against that rotational contactor 6. When rotational motion is imparted in the counterclockwise direction, the flexure bar 4 contacts the stop bar 65, which does not move and thus provides a constant stiffness level. Thus, the embodiment of FIG. 3D may be employed where stiffness variation is only sought in one direction. The immobile stop bar 65 may be designed and positioned to provide any level of constant stiffness, from maximum stiffness to very low, or even zero stiffness.

One intended use of the presently disclosed VSA 3 is for robotics applications in which a robot interacts with its environment, e.g., manufacturing tasks, any task that involves physical manipulation/interaction. Variable stiffness actuation will allow robots to provide high accuracy positioning in free space, like conventional manipulators, when joint stiffness is high. The stiffness of each joint will be able to be adjusted independently so that robots will be able to have directions of high stiffness and directions of low stiffness to perform useful work without damage to the robot or external structures or people. An example of constrained manipulation would be to use a robot to tighten a bolt. The robot must be stiff in the direction associated with advancing the bolt in the threaded hole, but compliant in the directions that are constrained by the wrench/bolt interaction that do not advance the bolt in the hole.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A selectable-rate spring, the selectable-rate spring comprising:
    a flexure bar connected to a rotatable shaft defining a shaft axis, the flexure bar having at least one arched portion;
    a rotatable plate rotatable about the shaft axis; and
    a first rotational contactor rotatably connected to the rotatable plate at a first axis, the first axis radially displaced from the shaft axis, wherein the first rotational contactor rotates about the first axis while maintaining contact with the arched portion of the flexure bar;
    wherein as the first rotational contactor rotates about the first axis, contact between the first rotational contactor and the arched portion of the flexure bar selectively changes a connection stiffness between the rotatable shaft and the rotatable plate.

2. The selectable-rate spring of claim 1 further comprising at least one bearing at a contact end of the rotational contactor, wherein as the first rotational contactor rotates about the axis the bearing rolls along the arched portion of the flexure bar.

3. The selectable-rate spring of claim 1 further comprising a motor connected to the first rotational contactor so as to rotate the first rotational contactor.

4. The selectable-rate spring of claim 1 further comprising a second arched portion of the flexure bar and a second rotational contactor rotatably connected to the rotatable plate at a second axis, the second axis radially displaced from the shaft axis, wherein the second rotational contactor rotates about the second axis to selectively change the connection stiffness between the rotatable shaft and the rotatable plate.

5. The selectable-rate spring of claim 4 further comprising a drive motor connected to the first and second rotational contactors so as to simultaneously rotate the rotational contactors in opposite rotational directions.

6. The selectable-rate spring of claim 4, wherein the first and second rotational contactors are positioned on opposite sides of the rotatable shaft.

7. The selectable-rate spring of claim 1 further comprising four rotational contactors, including the rotational contactor, each rotatably connected to the rotatable plate at a respective axis of four axes, wherein the flexure bar has four arched portions and each rotational contactor rotates about the respective axis while maintaining contact with a respective one of the four arched portions.

8. The selectable-rate spring of claim 7, wherein each of the four rotational contactors comprises at least one bearing at a contact end of the rotational contactor, wherein as the rotational contactor rotates about the separate axis the bearing rolls along the respective arched portion of the flexure bar.

9. The selectable-rate spring of claim 8 further comprising a housing surrounding the flexure bar and the four rotational contactors;

wherein the housing provides a connection point to the rotatable plate and wherein the four rotational contactors are rotatably connected to the housing.

10. The selectable-rate spring of claim 1, wherein the flexure bar is comprised of a superelastic alloy.

11. A variable stiffness actuator comprising:
a drive motor having a drive shaft, the drive motor operable to impart a torque to the drive shaft;
a flexure bar rigidly connected to the drive shaft, the flexure bar having an arched portion;
a first rotational contactor rotatably connected at a first axis to a rotatable plate, wherein the first rotational contactor rotates about the first axis while maintaining contact with the arched portion of the flexure bar; and
a motor connected to the first rotational contactor so as to rotate the rotational contactor about the first axis;
wherein as the rotational contactor rotates, contact between the first rotational contactor and the arched portion of the flexure bar selectively changes a connection stiffness between the drive shaft and the rotatable plate at the torque imparted on the drive shaft.

12. The variable stiffness actuator of claim 11 further comprising a second arched portion of the flexure bar and a second rotational contactor rotatably connected at a second axis to the rotatable plate,
wherein the second rotational contactor rotates about the second axis while maintaining contact with the second arched portion of the flexure bar; and
wherein the at least two rotational contactors are positioned on opposing sides of the flexure bar, each rotating in opposite rotational directions respectively about the first axis and the second axis while maintaining contact with the respective arched portion of the flexure bar.

13. The variable stiffness actuator of claim 11, wherein the first rotational contactor has at least one bearing at a contact end thereof, wherein as the rotational contactor rotates about the first axis the bearing rolls along the arched portion of the flexure bar.

14. The variable stiffness actuator of claim 12, wherein the first and second rotational contactors are positioned on opposing sides of the drive shaft.

15. The variable stiffness actuator of claim 11 comprising at least four rotational contactors, each rotating about a separate axis while maintaining contact with a respective arched portion of the flexure bar.

16. The variable stiffness actuator of claim 11 further comprising a housing connected to the rotatable plate and surrounding the flexure bar and the rotational contactor, wherein the housing is further secured to a link member.

17. The variable stiffness actuator of claim 11, wherein the rotatable plate further comprises a link member.

18. A system for providing variable stiffness actuation, the system comprising:
a drive motor having a drive shaft, the drive motor operable to impart a torque to the drive shaft;
a rotatable plate rotatable about an axis of the drive shaft;
a selectable-rate spring rotatably connecting the drive shaft to the rotatable plate, and comprising:
a flexure bar rigidly connected to the drive shaft, the flexure bar having at least two arched portions;
a first rotational contactor rotatably connected at first axis to the rotatable plate and a second rotational contactor rotatably connected at a second axis to the rotatable plate, wherein the first and second axis are each radially displaced from the axis of the drive shaft, and the rotational contactors respectively rotate about the first axis and the second axis to change contact between the contactors and the flexure bar to selectively control the connection stiffness between the rotatable shaft and the rotatable plate; and
a motor connected to both of the rotational contactors so as to rotate the rotational contactors to vary a stiffness of the selectable-rate spring independent of the torque imparted on the drive shave by the drive motor.

19. The system for providing variable stiffness actuation of claim 18, wherein the rotational contactors are connected to a link member via a housing secured to the rotatable plate, wherein the housing surrounds the flexure bar and the at least two rotational contactors.

20. The system for providing variable stiffness actuation of claim 19, wherein the motor connected to the rotational contactors is mounted to the housing.

* * * * *